United States Patent
Radhakrishnan et al.

(10) Patent No.: US 7,156,973 B2
(45) Date of Patent: Jan. 2, 2007

(54) PROCESS FOR PREPARING A CONDUCTING POLYMER ELECTRODE USEFUL FOR ELECTROCATALYTIC OXIDATION OF ALCOHOLS

(75) Inventors: Subramaniam Radhakrishnan, Maharashtra (IN); Arindam Adhikari, Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 246 days.

(21) Appl. No.: 10/620,814

(22) Filed: Jul. 17, 2003

(65) Prior Publication Data

US 2005/0016860 A1    Jan. 27, 2005

(51) Int. Cl.
  *C25D 5/54* (2006.01)
  *C25D 5/56* (2006.01)
  *C23C 28/00* (2006.01)

(52) U.S. Cl. .................. 205/164; 205/162; 205/188

(58) Field of Classification Search ................ 205/162, 205/164, 188, 414
See application file for complete search history.

(56) References Cited

U.S. PATENT DOCUMENTS 4,559,112 A * 12/1985 Tamamura et al. .......... 205/50
5,126,017 A * 6/1992 Nakama et al. ............ 205/159

FOREIGN PATENT DOCUMENTS

JP    02018423 A * 1/1990

* cited by examiner

*Primary Examiner*—Edna Wong
(74) *Attorney, Agent, or Firm*—Nixon & Vanderhye P.C.

(57) ABSTRACT

This invention relates to increasing the electrocatalytic activity of conducting polymers so that the same may be useful for electro-oxidation of methanol which is important for fuel-cell technology. Conventional catalysts used for this process are based on Pt, Ru or Pd complexes which are incorporated in carbon/graphite based electrodes. However, these are not only expensive but difficult to fabricate in different shapes. Conducting polymer based electrodes have advantage of ease of fabrication but their activity has been found in the past to be not very high. The present invention provides a process for preparation of conducting polymer based electrodes which have very high catalytic activity (8 to 10 times higher) for electro-oxidation of methanol.

15 Claims, No Drawings

PROCESS FOR PREPARING A CONDUCTING POLYMER ELECTRODE USEFUL FOR ELECTROCATALYTIC OXIDATION OF ALCOHOLS

FIELD OF THE INVENTION

The present invention relates to a process for the preparation of a conducting polymer electrode useful for electrocatalytic oxidation of alcohols. More particularly it relates to modification of metallic anode using conducting polymers having appropriate composition which can be used for electro-oxidation of methanol useful for fuel cells

BACKGROUND OF THE INVENTION

Oxidation of alcohols particularly methanol using electrocatalytic process is useful for fuel cells such as, direct methanol fuel cells (DMFC). The efficiency of the fuel cell depends very much on the active surface of the electrodes. In order to increase the electrocatalytic efficiency the electrodes are often activated using palladium, platinum and ruthenium complexes (J. Appl. Electrochem., Vol.28 (1998) p. 1389–1397; J. Power Sources, Vol 79 (1999) p. 43–59, Jpn. Kokai Tokkyo Koho JP 2001256982 A2 21 September 2001, 11 pp ). However, these type of reactions usually take place efficiently at high temperatures. Since high pressure can build up during such processes, it leads to hazardous conditions due to possibilities of explosion. Hence, it is desirable to carry out such reactions at normal ambient conditions, which can be feasible by electrochemical methods using special electrodes. The electro-oxidation of alcohols using platinum activated carbon or graphite electrodes has been reported before (Electrochim Acta, 44(15), 1999 p.2559–2569) but the currents are not very high and the yield is poor. In order to increase the electrode activity it is essential to modify the same and preferably make it electrocatalytic so that high yield and selectivity are obtained for alcohol and in particular methanol. Further, the platinum, palladium or ruthenium based complexes are very expensive and hence they are not economical for use in DMFC type fuel cells. There is no prior art for preparation of conducting polymer electrodes with specific catalytic activity for alcohol.

OBJECTS OF THE INVENTION

The main object of the present invention is to provide a process for preparation of electrodes useful for electrocatalytic oxidation of methanol so as to make the electrodes more efficient and economical

SUMMARY OF THE INVENTION

Accordingly, the present invention provides a process for the preparation of a conducting electrode useful for the electrocatalytic oxidation of alcohols which comprises coating a substrate with a metallic or conducing backing layer, electrochemically coating the metal coated or conductive backing layer coated substrate with a polymer using a monomer or a mixture of monomer and an activating agent to obtain the conducting electrode.

In one embodiment of the invention, the substrate comprises an insulating polymer coated substrate.

In another embodiment of the invention, the electrochemically coated substrate is subjected to doping with a doping agent.

In another embodiment of the invention, the substrate is selected from the group consisting of a glass plate, polyester film having, smooth surface and an electrical resistivity of greater than $10^{10}$ ohm-cm.

In yet another embodiment of the invention, the metallic backing layer comprises of a vacuum deposited thin film of a metal selected from the group consisting of gold, platinum, and chromium.

In another embodiment of the invention, the conducting backing layer is selected from dip-coated carbon and graphite dispersions having inert nature in the potential range of 0 to 1.0 Volts with respect to saturated calomel electrode (SCE).

In yet another embodiment of the invention, the insulating polymer is selected from the group consisting of polyvinyl butyral, polyvinyl acetate and styrene butadiene co-polymer, having adhesion strength higher than 10 g/micron.

In a further embodiment of the invention, the insulating polymer solution is used in a concentration in the range of 1 to 2 wt/v.

In yet another embodiment of the invention, the activating agent is selected from the group consisting of halides of multivalent metals having electro-negativity ranging from 1.2 to 1.5.

In a further embodiment of the invention, the doping agent contains electron acceptor compounds such as copper chloride, ferric chloride, cobalt chloride and like Lewis acid compounds and is used in a concentration in the range of 0.001 M to 0.1 M preferably 0.006 M to 0.012 M.

In yet another embodiment of the invention, the monomer used for depositing conducting polymer film is selected from the group consisting of aromatic and heterocyclic compounds containing nitrogen.

In a further embodiment of the invention, the monomer is selected from the group consisting of aniline, pyrrole, anisidene and toluediene.

In yet another embodiment of the invention, the coating of the polymer on the metal pre-coated insulating substrate is preferably carried out by dipping the pre-treated insulating substrate in an aqueous electrolyte containing 0.1 to 0.5 M hydrogen containing mineral acids such as hydrochloric or sulfuric acid together with a monomer and a macrocyclic compound, by applying potential of 0.7 to 0.9 Volts.

In yet another embodiment of the invention, doping is done when the polymer deposition is carried out only with the monomer.

DETAILED DESCRIPTION OF THE INVENTION

The present invention provides a process for the preparation of a conducting electrode useful for the electrocatalytic oxidation of alcohols, preferably methanol, which comprises optionally coating a substrate with an insulating polymer, coating the substrate or the to substrate coated with insulating polymer with metallic or conducting backing layer by conventional methods, electrochemically coating the substrate or metal coated substrate with a polymer using a monomer, or a mixture of the monomer and an activator, optionally doping the said pre-coated substrate with a doping agent to obtain the conducting electrode.

The insulating substrate used generally comprises a glass plate, polyester film having smooth surface and electrical resistivity higher than $10^{10}$ ohm-cm. The metallic or conducting backing layer comprises of vacuum deposited thin films of gold, platinum, chromium or dip-coated carbon or graphite dispersions having inert nature in the potential range of 0 to 1.0 Volts with respect to saturated calomel electrode (SCE).

The polymer used for pre-treating the insulating substrates comprises polyvinyl butyral, polyvinyl acetate, styrene butadiene co-polymer having adhesion strength higher than 10 g/micron. The concentration of polymer solution used for pre-coating is in the range of 1 to 2 wt./v. The activator is chosen from halides of multivalent metals having electro-negativity ranging from 1.2 to 1.5. The doping agent used contains electron acceptor compounds such as copper chloride, ferric chloride, cobalt chloride and similar Lewis acid compounds in the concentration range of 0.001 M to 0.1 M preferably 0.006 M to 0.012 M.

The monomer used for depositing conducting polymer film is selected from the group consisting of aromatic or heterocyclic compounds containing nitrogen such as aniline, pyrrole, 3-methyl pyrrole, anisidene and toluediene.

In a feature of the present invention the conventional coating of the polymer on the metal pre-coated insulating substrate is preferably carried out by dipping the pre-treated insulting substrate in an aqueous electrolyte containing 0.1 to 0.5 M hydrogen containing mineral acids such as hydrochloric or sulfuric acid together with a monomer and a macrocyclic compound, by applying potential of 0.7 to 0.9 Volts. The doping is optionally done when the polymer deposition is carried out only with the use of the monomer.

The process of the present invention is described herein below with reference to the following illustrative examples, and should not be construed to limit the scope of the invention in any manner.

EXAMPLE-1

Clean microscopic grade glass slides were dip coated in a solution (1.0 wt %) of polyvinyl butyral in methanol, dried and heated to 60° C. for few minutes to drive off the solvent. These were placed in a vacuum deposition chamber, which was evacuated to $10^{-6}$ torr and gold films (0.1 to 0.2 um thick) were deposited using thermal evaporation technique. The substrates with metallic coating were placed in an electrochemical cell as working electrode, platinum foil as counter electrode and SCE reference electrode. In the electrochemical cell 100 ml distilled water was taken, 0.55 g of pyrrole and 0.8 ml of $H_2SO_4$ was added and mixed properly. This is solution (A). In a separate beaker 50 ml distilled water was taken and 0.5 g of pyrrole was added with stirring after which 0.419 g of $ZrCl_4$ was added to this and mixed thoroughly and allowed to stand for 1 hour. This formed solution (B). The solution (B) was slowly poured in the solution (A) in the electrochemical cell. The conducting polymer deposition was carried out by applying a potential of 0.7V (Saturated standard Calomel Electrode) for 120 seconds to the working electrode. The modified electrodes were removed and dried at 25° C. for 2 to 3 hours.

EXAMPLE-2

The clean microscopic glass plates were dip coated in a solution (1.0 wt %) of styrene-butadiene copolymer in toluene and dried at 50° C. for 10 min. These were placed in a vacuum chamber, which was evacuated to $10^{-6}$ torr and gold films deposited by thermal evaporation technique. These were then placed in the electrochemical cell with platinum counter electrode and SCE reference electrode. 100 ml distilled water was taken in the electrochemical cell to which were added 0.55 g of pyrrole and 0.8 ml of $H_2SO_4$ with stirring. This is solution (A). In a separate beaker 50 ml distilled water was taken and 0.5 g of pyrrole was added with stirring after which 0.356 g $MnCl_2$ was added to this mixture with stirring and then allowed to stand for 1 hour. This formed solution (B). The solution (B) was slowly poured in the solution (A) in the electrochemical cell. The conducting polymer deposition was carried out by applying a potential of 0.7V (Saturated standard Calomel Electrode) for 120 seconds to the working electrode. The modified electrodes were removed and dried at 25° C. for 2 to 3 hours.

EXAMPLE-3

Clean microscopic grade glass slides were dip coated in a solution (1.0 wt % o) of polyvinyl butyral in methanol, dried and heated to 60° C. for few minutes to drive off the solvent. These were placed in a vacuum deposition chamber which was evacuated to 10-6 torr and gold films (0.1 to 0.2 um thick) were deposited using thermal evaporation technique. The substrates with metallic coating were placed in an electrochemical cell as working electrode, platinum foil as counter electrode and SCE reference electrode. 100 ml distilled water was taken in the electrochemical cell to which were added 0.55 g of pyrrole and 0.8 ml of $H_2SO_4$ with stirring. This is solution (A). In a separate beaker 50 ml distilled water was taken and 0.5 g of pyrrole was added with stirring after which 0.285 g $NiCl_2$ was added to this mixture with stirring and then allowed to stand for 1 hour. This formed solution (B). The solution (B) was slowly poured in the solution (A) in the electrochemical cell. The conducting polymer deposition was carried out by applying A potential of 0.7V (Saturated standard Calomel Electrode) for 120 seconds to the working electrode. The modified electrodes were removed and dried at 25° C. for 2 to 3 hours.

The anodic oxidation of methanol was carried out with these electrodes prepared by the process described in the present invention in an electrochemical cell containing 150 ml of distilled water in which oxygen was bubbled for an hour, 1.06 g HClO4 and 0.048 g of methanol were added to the solution. The anodic current was measured at the methanol oxidation potential of 0.5 V (SCE) applied to the electrodes. The results for the electrodes prepared by the process described in the present invention are given in Table-1

TABLE 1

| Electrodes | Peak Current ($\mu$ Amps) (MeOH oxidation) |
| --- | --- |
| Example 1 | 63,000 |
| Example 2 | 40,000 |
| Example 3 | 43,000 |
| Bare Pt | 2000 |
| Conducting polymer Without activator | 5000 |

It can be seen by comparing the values of oxidation currents given in the above Table-1 that the electrodes prepared according to the process described in the present invention are much more efficient for methanol oxidation.

Advantages of the Invention

The main advantage of the present invention is that it makes use of much cheaper material than metals/metallic complexes based on palladium, ruthenium, platinum etc. It also gives better results than the latter compounds. Further, the electrodes can be easily made in any shape or size as desired for their applications in fuel cells.

We claim:

1. A process for the preparation of a conducting electrode, which is useful for the electrocatalytic oxidation of alcohols, the process comprising coating an insulating polymer coated substrate with a metallic or conducting backing layer to obtain a metallic or conducting backing layer coated substrate, and electrochemically coating the metallic or conducting backing layer coated substrate with a conducting polymer using a monomer or a mixture of monomer and an activating agent to obtain the conducting electrode.

2. A process as claimed in claim 1 wherein the substrate is selected from the group consisting of a glass plate and a polyester film having a smooth surface and an electrical resistivity of greater than $10^{10}$ ohm-cm.

3. A process as claimed in claim 1 wherein the metallic backing layer comprises a vacuum deposited thin film of a metal selected from the group consisting of gold, platinum and chromium.

4. A process as claimed in claim 1 wherein the conducting backing layer is selected from dip-coated carbon and graphite dispersions having inert nature in the potential range of 0 to 1.0 Volts with respect to saturated calomel electrode (SCE).

5. A process as claimed in claim 1 wherein the insulating polymer is selected from the group consisting of polyvinyl butyral, polyvinyl acetate and styrene butadiene co-polymer, having adhesion strength higher than 10 g/micron.

6. A process as claimed in claim 5 wherein the insulating polymer is a solution used in a concentration in the range of 1 to 2 wt./v.

7. A process as claimed in claim 1 wherein the activating agent is selected from the group consisting of halides of multivalent metals with electronegativity in the range of 1.2 to 1.5.

8. A process as claimed in claim 1 wherein the conducting polymer coated substrate is subjected to doping with a doping agent when only the monomer is used.

9. A process as claimed in claim 8 wherein the doping agent contains electron acceptor compounds and is used in a concentration in the range of 0.001 M to 0.1 M.

10. A process as claimed in claim 9 wherein the electron acceptor compounds are selected from the group consisting of copper chloride, ferric chloride, cobalt chloride and Lewis acid compounds.

11. A process as claimed in claim 9 wherein the concentration used is in the range of 0.006 M to 0.012 M.

12. A process as claimed in claim 1 wherein the monomer is selected from the group consisting of aromatic and heterocyclic compounds containing nitrogen.

13. A process as claimed in claim 1 wherein the monomer is selected from the group consisting of aniline, pyrrole, anisidine and toluediene.

14. A process as claimed in claim 1 wherein the coating of the conducting polymer on the metallic or conducting backing layer of the substrate is carried out by dipping the metallic or conducting backing layer of the substrate in an aqueous electrolyte containing 0.1 to 0.5 M hydrogen containing mineral acids together with the monomer and a macrocyclic compound, and by applying a potential of 0.7 to 0.9 Volts.

15. A process as claimed in claim 14 wherein the hydrogen containing mineral acid is hydrochloric or sulfuric acid.

* * * * *